J. W. PARKER.
GEARING.
APPLICATION FILED JUNE 29, 1921.

1,438,134.

Patented Dec. 5, 1922.

Inventor
James W. Parker.

By [signature]

Attorneys.

Patented Dec. 5, 1922.

1,438,134

UNITED STATES PATENT OFFICE.

JAMES W. PARKER, OF CHICAGO, ILLINOIS.

GEARING.

Application filed June 29, 1921. Serial No. 481,391.

*To all whom it may concern:*

Be it known that I, JAMES W. PARKER, a citizen of the United States, residing at Chicago, in the county of Cook and State of Illinois, have invented new and useful Improvements in Gearing, of which the following is a specification.

This invention relates to gearing for operating corn-planters and similar agricultural or other machinery in which the power for driving the seed-dropping or other mechanism is obtained from the supporting wheels of the machine.

The invention has for its object to provide a gearing in a machine of the kind stated which permits the supporting wheels to be set in a sidewise inclined position on their axle in order that the ground over which they travel may be agitated rather than compressed as would be the case if they were set perpendicular.

The invention also has for its object to provide a gearing which permits the angles of the wheels with respect to the ground to be readily changed to obtain the best results.

Figure 1:
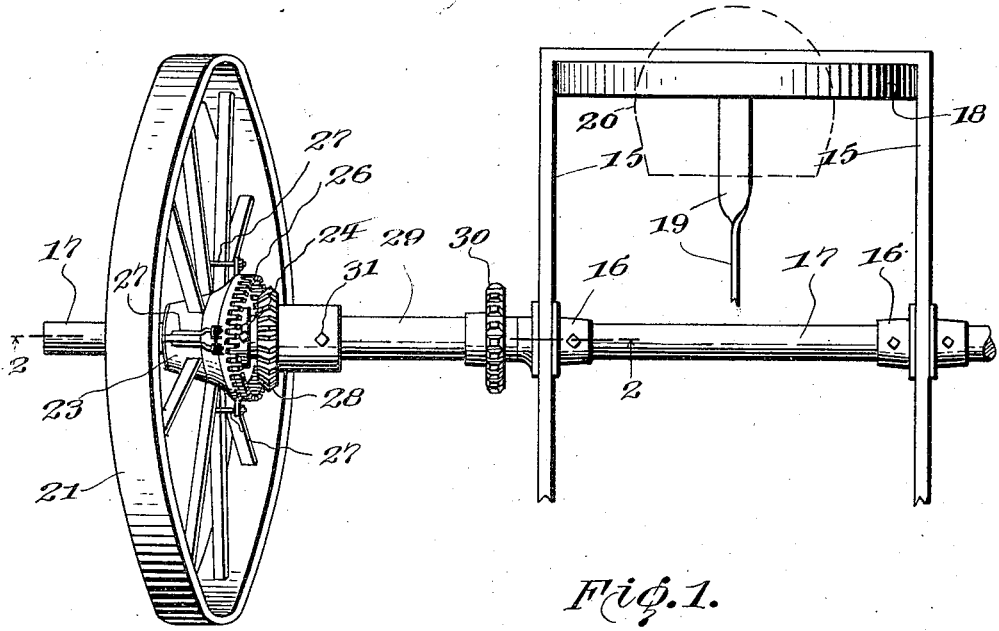
Figure 2:
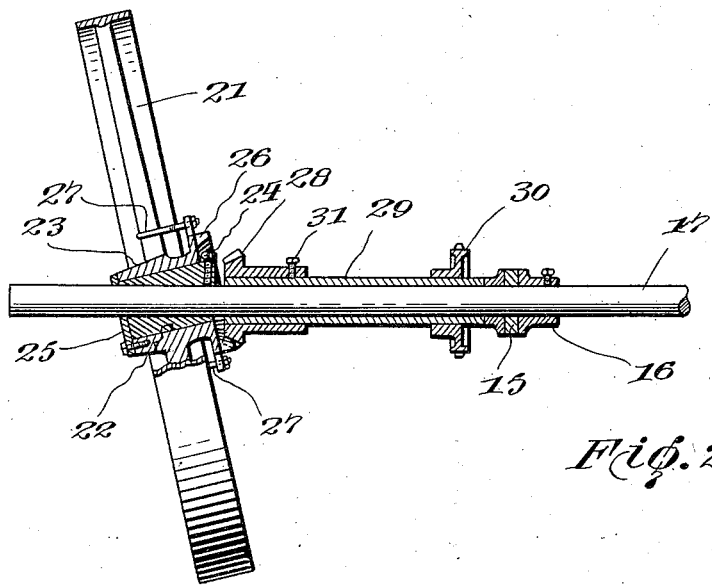

The objects stated are attained by means of a novel combination and arrangement of parts to be hereinafter described and claimed, and in order that the same may be better understood, reference is had to the accompanying drawing, wherein:

Figure 1 is a plan view of one side of the machine, the other side, which is a duplicate, not being shown, and Fig. 2 is a section on the line 2—2 of Fig. 1.

Referring specifically to the drawings, 15 denotes the side bars of the frame of the machine, the same carrying the axles of the supporting wheels. The drawing shows only one of the wheels, it being understood that the wheel at the other side of the machine is the same in construction and arrangement.

The frame side bars 15 carry cuffs 16 for supporting the axle 17, the latter being stationary. At the rear of the frame, the side bars 15 are connected by an arch 18, which latter, with a diagonal brace 19, support a seat 20 for the driver.

The ground wheels 21 are loose on the axle 17, and they are canted similar to the furrow wheels of wheeled plows, so that they are inclined sidewise as clearly shown in Figs. 1 and 2. This arrangement of the wheels causes the ground over which they travel to be agitated rather than compressed as would be the case if they were set erect.

Referring more particularly to Fig. 2, it will be noted that the axle carries an obliquely positioned spindle 22 to give the wheel 21 the desired slant or inclination, and the hub 23 of the wheel is loose on this spindle, the latter being fastened to the axle 17 by a set screw 24, and carrying a hub retaining plate 25 engageable with the outer end of the hub.

Inasmuch as the wheel 21 is designed to also drive the seed-dropping mechanism, the hub 23 is fitted with a bevel gear 26 secured to the wheel spokes by clips 27. The gear 26 meshes with a bevel gear 28 on a sleeve 29 carrying a sprocket wheel 30. The gear 28 is adjustable lengthwise on the sleeve 29, and it is secured in adjusted position by a set screw 31. Thus, by turning the spindle 22 after loosening the set screw 24, the angle of the wheel 21 with respect to the ground may be varied as desired, and as the gear 28 is adjustable on the sleeve 29, it can be set to come in proper mesh with the gear 26 with the new position of the wheel. The sleeve 29 is supported by the axle 17, it being loose thereon.

The motion of the socket wheel 30 is transmitted to the seed-dropping or other mechanism by a suitable gearing which need not be illustrated.

I claim:

1. The combination of a stationary shaft, a spindle carried by the shaft and positioned obliquely with respect to its longitudinal axis, said spindle being rotatable on the shaft, means for locking the spindle on the shaft, and a driving member journaled on the spindle.

2. The combination of a stationary shaft, a spindle on the shaft and positioned obliquely with respect to the longitudinal axis thereof, said spindle being rotatable on the shaft, means for locking the spindle on the shaft, a driving member journaled on the spindle, a bevel gear carried by the driving member, a driven member loose on the shaft, and a bevel gear carried by said member and in mesh with the first mentioned bevel gear.

3. The combination of a stationary shaft, a spindle on the shaft and positioned obliquely with respect to the longitudinal axis thereof, said spindle being rotatable on the shaft, means for locking the spindle on the shaft, a driving member journaled on the spindle, a bevel gear on the driving member, a driven member loose on the shaft, and a bevel gear carried by said member and in mesh with the first mentioned bevel gear, the gear of the driven member being adjustable toward and from the gear of the driving member.

In testimony whereof I affix my signature.

JAMES W. PARKER.